United States Patent
Shellum et al.

(10) Patent No.: US 6,639,976 B1
(45) Date of Patent: Oct. 28, 2003

(54) METHOD FOR PARITY ANALYSIS AND REMEDY CALCULATION

(75) Inventors: Paul Shellum, Sterrett, AL (US); Mitch Elmore, Homewood, AL (US); Bill Grant, Westlake, OH (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 80 days.

(21) Appl. No.: 10/026,417

(22) Filed: Dec. 21, 2001

Related U.S. Application Data

(60) Provisional application No. 60/260,760, filed on Jan. 9, 2001.

(51) Int. Cl.⁷ .................. H04M 15/00; G05B 13/02; G06F 11/30
(52) U.S. Cl. ............. 379/112.06; 379/112.01; 379/111; 379/112.07; 379/139; 700/32; 702/182
(58) Field of Search ............ 379/112.06, 112.01, 379/112.07, 112.08, 115.01, 115.02, 118, 120, 121.01, 134, 137, 138, 139; 700/32; 702/179, 180, 181, 182, 183; 455/67.1, 405

(56) References Cited

U.S. PATENT DOCUMENTS

| | | | |
|---|---|---|---|
| 5,799,072 A | * | 8/1998 | Vulcan et al. ......... 379/114.02 |
| 5,940,471 A | * | 8/1999 | Homayoun .................... 379/1 |
| 6,389,112 B1 | * | 5/2002 | Stewart et al. ........... 379/29.09 |
| 6,449,350 B1 | * | 9/2002 | Cox ......................... 379/134 |
| 6,480,749 B1 | * | 11/2002 | Lee, Jr. et al. ................ 700/32 |
| 6,526,025 B1 | * | 2/2003 | Pack ......................... 370/252 |
| 6,542,588 B1 | * | 4/2003 | Mashinsky ............ 379/114.02 |
| 6,542,593 B1 | * | 4/2003 | Bowman-Amuah .... 379/201.03 |

* cited by examiner

*Primary Examiner*—Rexford Barnie
(74) *Attorney, Agent, or Firm*—Cantor Colburn LLP

(57) ABSTRACT

A method for parity analysis and remedy calculation is provided. The method uses performance measurements that measure the timeliness, accuracy and availability of the services provided by an incumbent local exchange carrier ("ILEC") to determine whether parity exists between services provided to the ILEC and services provided to a competitive local exchange carrier ("CLEC"). The performance measurements are compared at an appropriate level so that a like-to-like comparison is made. The difference between the average of the ILEC performance measurements and the average of the CLEC performance measurements is computed. An aggregate difference measurement is also computed and is used to determine whether parity exists. If parity does not exist, then a remedy is calculated.

16 Claims, 3 Drawing Sheets

METHOD FOR PARITY ANALYSIS AND REMEDY CALCULATION

RELATED APPLICATION

This U.S. patent application claims priority to U.S. Provisional Patent Application Serial No. 60/260,760 entitled "PARIS: Parity Analysis and Remedy Information System" filed Jan. 9, 2001 which is incorporated herein by reference.

TECHNICAL FIELD

This invention relates in general to the analysis of data, and more particularly to analyzing performance measurement data to determine whether parity exists between the services provided by an incumbent local exchange carrier to its customers and the services provided by the incumbent local exchange carrier to the customers of a competing local exchange carrier.

BACKGROUND OF THE INVENTION

At one time, a local telephone market was served by a single local exchange carrier. However, local telephone markets are now open to competition from competitive local exchange carriers ("CLECs"). The incumbent local exchange carrier ("ILEC") in a market is required to offer services to the CLECs that are equivalent to the services that it provides itself so that a competitive environment exists.

To determine whether an ILEC is providing services to the customers of a CLEC that are equivalent to the services that it provides its own customers, data is collected that measures the performance of the services provided to the ILEC's customers and the performance of the services provided to the CLEC's customers. One system for collecting transactional data and calculating performance measurements is described in U.S. patent application Ser. No. 09/474,356 entitled "Method for Performance Measurement and Analysis of Local Exchange Carrier Interconnections" which is incorporated herein by reference. The performance measurements typically measure the timeliness, accuracy and availability of the services provided. For example, a performance measurement can be defined to measure the percentage of missed repair appointments.

Although the ILEC is required to provide equivalent services, there is no established method for determining whether the services provided are equivalent. Thus, there is a need for a method for determining whether an ILEC is providing services to the customers of a CLEC that are equivalent to the services that it is providing to its own customers. The method should be flexible enough to accommodate a variety of performance measurements so that a comprehensive comparison can be made.

If the ILEC does not provide services to the CLECs that are at least equal in quality to the services provided to the ILEC itself, then the ILEC may be subject to penalties. For example, a state public service commission ("PSC") may impose monetary penalties for the failure to provide equivalent services or the ILEC may be denied entry into the long distance market. Thus, there is a need for a method for calculating a remedy if the ILEC is not providing services to the customers of a CLEC that are equivalent to the services that it is providing to its own customers. The method should be flexible enough to accommodate a variety of penalties that may be imposed by PSC's in different states.

SUMMARY OF THE INVENTION

The present invention meets the needs described above by providing a method for determining whether parity exists between the services provided by an ILEC to its customers and the services provided by the ILEC to the customers of a CLEC. In addition, the present invention provides a method for calculating a remedy if parity does not exist.

In one aspect of the invention four types of performance measurements are used to determine whether parity exists: 1) mean measurements, 2) proportion measurements, 3) rate measurements and 4) ratio measurements. The performance measurements typically measure the timeliness, accuracy and availability of the services provided by the ILEC. The performance measurement data is obtained from a performance measurement and analysis system.

The data is loaded into a number of fact tables. The fact tables are created so that each row corresponds to a transaction. Once the fact tables are loaded, a number of relation tables are created. The relation tables are created so that each row corresponds to a performance measurement.

A number of aggregation tables are also created. The aggregation tables contain summarized data that is used in determining whether parity exists. The aggregation tables aggregate performance measurements based on factors, such as product group, product, entity, geography and time, so that a like-to-like comparison is made. Once the aggregation tables are created, a number of cell tables are created. Each row in a cell table corresponds to a performance measurement and contains data for a service provided by the ILEC to its customers and data for an analogous service provided by the ILEC to a CLEC's customers.

An individual Z-score is calculated for each row in a cell table. The individual Z-score reflects the difference between the average of the ILEC performance measurements and the average of the CLEC performance measurements. Once the individual Z-scores are calculated, an aggregate Z-score is calculated. The aggregate Z-score aggregates the individual Z-scores that are related to a particular CLEC.

A balancing critical value ("BCV") is calculated so that the probability of a type I error and the probability of a type II error are equal. A type I error results if the calculation indicates that favoritism exists, when no favoritism exists and a type II error results if the calculation indicates that parity exists, when favoritism exists.

To determine whether parity exists, the difference between the aggregate Z-score and the BCV is calculated. If the difference is negative, then it is determined that favoritism exists and an appropriate remedy is calculated. However, if the difference is not negative, then parity exists and no remedy is required.

These and other aspects, features and advantages of the present invention may be more clearly understood and appreciated from a review of the following detailed description of the disclosed embodiments and by reference to the appended drawings and claims.

DETAILED DESCRIPTION OF THE INVENTION

The present invention is directed to a method for analyzing performance measurement data to determine whether parity exists between services provided by an incumbent local exchange carrier ("ILEC") to its customers and services provided by the ILEC to the customers of one or more competitive local exchange carriers ("CLECs"). Briefly described, the method uses statistical analysis to compare performance measurements for the services provided to the ILEC's customers with the services provided to the CLEC's customers to determine if parity exists. The method compares performance measurements at appropriate levels so that a like-to-like comparison is made. If it is determined that parity does not exist, then the method calculates a remedy. The remedy can be based upon a comparison between the performance measurements for the ILEC and a particular CLEC or upon a comparison between the performance measurements for the ILEC and all the CLECs within a state.

Exemplary Operating Environment

Figure 1:
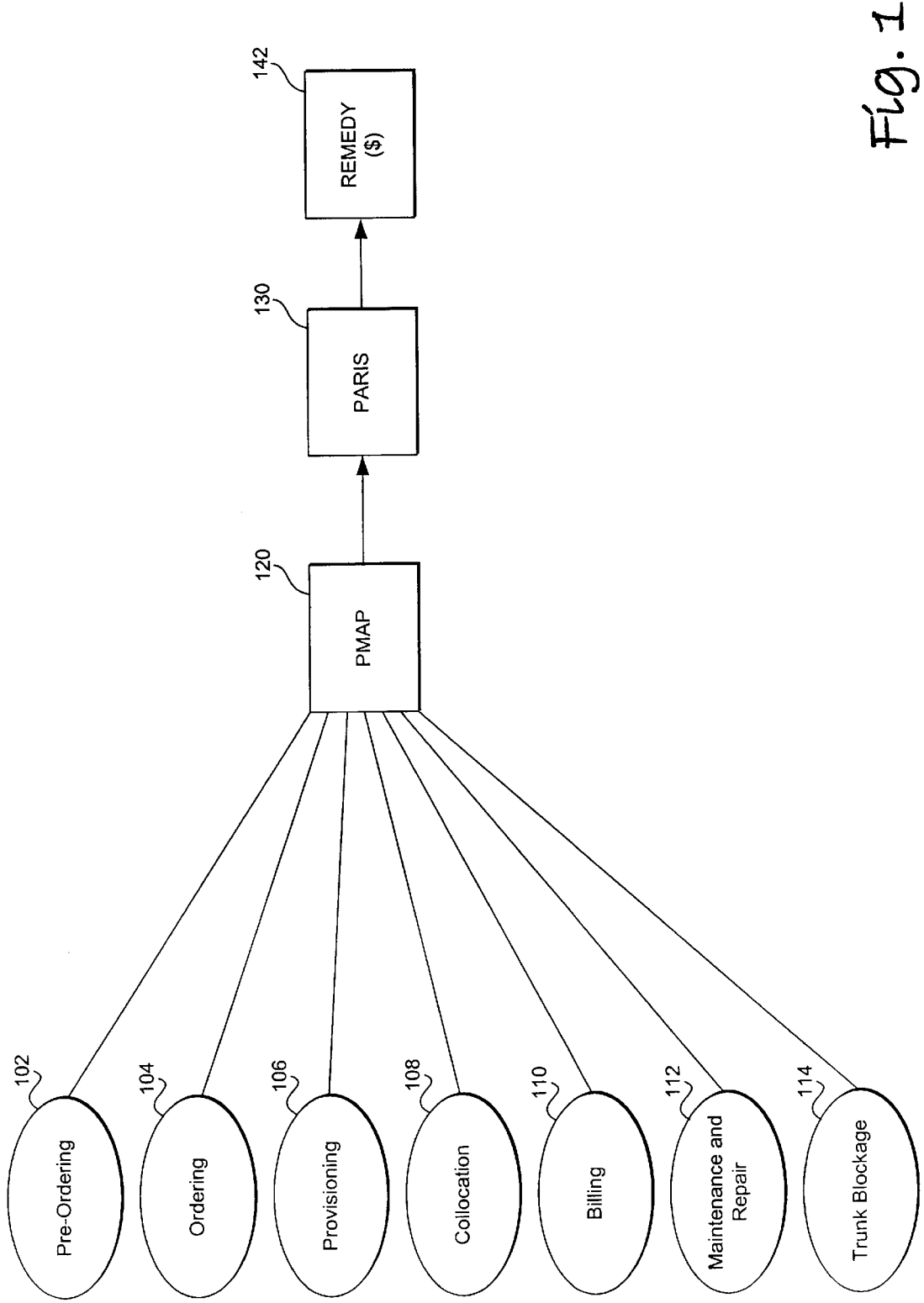
FIG. 1 is a block diagram illustrating an exemplary system for analyzing parity and calculating a remedy, in accordance with an embodiment of the invention.

An exemplary operating environment for the present invention is illustrated in FIG. 1. FIG. 1 includes a performance measurement and analysis platform (the "PMAP system") 120. The PMAP system uses transactional data from some of the processes that an ILEC uses to provide services to its customers and to the customers of the CLECs. FIG. 1 illustrates several exemplary processes, including a pre-ordering process 102, an ordering process 104, a provisioning process 106, a collocation process 108, a billing process 110, a maintenance and repair process 112, and a trunk blockage process 114. Additional processes can also be included. The transactional data is collected from the processes by the PMAP system and is used to calculate a number of performance measurements. The performance measurements measure the timeliness, accuracy and availability of the services provided by an ILEC to its customers and the services provided by the ILEC to the customers of one or more CLECs. An exemplary PMAP system is described in U.S. patent application Ser. No. 09/474,356 entitled "Method for Performance Measurement and Analysis of Local Exchange Carrier Interconnections" (the "PMAP Application"), which is incorporated herein by reference.

The PMAP system provides transactional data to a parity analysis and remedy information system (the "PARIS system") 130. The PARIS system typically uses a subset of the performance measurements calculated by the PMAP system. The PARIS system analyzes the performance measurements to determine whether parity exists between the services provided by an ILEC to its customers and the services provided by the ILEC to the customers of a CLEC. If parity does not exist, then the PARIS system calculates a remedy 142. Two types of remedies are calculated. One type of remedy is paid to a particular CLEC based on a comparison between the performance measurements for the ILEC and the performance measurements for the CLEC. A second type of remedy is paid to a public service commission ("PSC") and is based on a comparison between the performance measurements for the ILEC and the performance measurements for all of the CLECs within a state.

Performance Measurements

Typically, performance measurements include percentage, interval and accuracy measurements. A performance measurement that measures a percentage is defined to be an actual number divided by a total or scheduled number and multiplied by 100. For example, a missed repair appointments performance measurement is defined as follows:

Percentage of missed repair appointments=Σ(count of customer troubles not cleared by the quoted commitment date and time)/Σ(total trouble reports closed in reporting period)×100

A performance measurement that measures an interval is defined to be an actual time interval for an event divided by the total number of events. For example, an average completion interval performance measurement is defined as follows:

Average Completion Interval=Σ[(completion date and time)−(order issue date and time)]/Σ(total orders completed in reporting period)

A performance measurement that measures accuracy is defined to be the percentage of correct events to total events. For example, an invoice accuracy performance measurement is defined as follows:

Invoice Accuracy=(total billed revenues)−(billing related adjustments)/(total billed revenues)

In the exemplary embodiment described herein, a subset of the performance measurements calculated by the PMAP system are used to determine whether parity exists between the services provided by an ILEC to its customers and the services provided by the ILEC to the customers of a CLEC. There are four types of measurements: 1) mean measurements, 2) proportion measurements, 3) rate measurements and 4) ratio measurements. The proportion and rate measurements are examples of percentage measurements, the mean measurements are examples of interval measurements and the ratio measurements are examples of accuracy measurements. The following tables summarize the performance measurements used in the exemplary embodiment to determine whether parity exists. In addition, a ratio measurement, such as invoice accuracy, can also be used. Additional information on the performance measurements can be found in the PMAP Application.

TABLE 1

Mean Measurements

Order Completion Interval (Dispatch only)-POTS
Order Completion Interval (Dispatch only)-Design
Order Completion Interval (Dispatch only)-UNE Loop & Port Comb
Order Completion Interval (Dispatch only)-UNE Loops
Order Completion Interval (Dispatch only)-IC Trunks
Maintenance Average Duration-POTS
Maintenance Average Duration-Design
Maintenance Average Duration-UNE Loop & Port Comb
Maintenance Average Duration-UNE Loops
Maintenance Average Duration-IC Trunks

TABLE 2

Proportion Measurements

Percent Missed Installation Appointments-POTS
Percent Missed Installation Appointments-Design
Percent Missed Installation Appointments-UNE Loop and Port Comb
Percent Missed Installation Appointments-UNE Loops
Percent Provisioning Troubles within 'x' Days-POTS
Percent Provisioning Troubles within 'x' Days-Design
Percent Provisioning Troubles within 'x' Days-UNE Loop and Port Comb
Percent Provisioning Troubles within 'x' Days-UNE Loops
Percent Missed Repair Appointments-POTS
Percent Missed Repair Appointments-Design
Percent Missed Repair Appointments-UNE Loop and Port Comb
Percent Missed Repair Appointments-UNE Loops
Percent Repeat Troubles within 'x' Days-POTS
Percent Repeat Troubles within 'x' Days-Design
Percent Repeat Troubles within 'x' Days-UNE Loop and Port Comb
Percent Repeat Troubles within 'x' Days-UNE Loops In the exemplary embodiment discussed herein, the 'x' days refers to 30 days. However, other embodiments can use a different time period.

TABLE 3

Rate Measurements

Customer Trouble Report Rate-POTS
Customer Trouble Report Rate-Design
Customer Trouble Report Rate-UNE Loop and Port Comb
Customer Trouble Report Rate-UNE Loops In some instances the products offered by a CLEC to its customers are not identical to the products offered by an ILEC to its customers. In these instances, analogous products are identified so that a like-to-like comparison can be made. After a like-to-like comparison is done at the product level, the products are aggregated into product groups prior to remedy calculation. Tables 1–3 include references to various product groups. Product groups are used so that a like-to-like comparison is made between a performance measurement for an ILEC and a performance measurement for a CLEC. The product groups are summarized below in Table 4 and include POTS, Design, UNE loops, UNE loops and combos and IC trunks.

TABLE 4

| Product Group | Product | Product Attributes |
|---|---|---|
| POTS | Residence | Non-Design |
| | Business | Non-Design |
| | PBX Non-Design | |
| | Centrex/ESSX Non-Design | |
| | ISDN Residence | Non-Design |
| | ISDN Business | Non-Design |
| Design | PBX Design | |
| | Centrex/ESSX Design | |
| | ISDN Design | |
| | Design | |
| UNE Loops | UNE 2 Wire Loop Non-Design | |
| | UNE 2 Wire Loop Design | |
| | UNE Loop Other | Design + Non-Design |
| UNE Loop + Port Combos | Combos-Loop + Port Design | |
| | Combos-Loop + Port Non-Design | |
| IC Trunk | Local Interconnection Trunks | Design + Non-Design |

Products are used to make a like-to-like comparison. As shown in Table 4, products include residence, business, PBX non-design, Centrex/ESSX non-design, ISDN residence and ISDN business in the POTS product group; PBX design, Centrex/ESSX design, ISDN design and design in the Design product group; UNE 2-wire loop non-design, UNE 2-wire loop design and UNE loop other in the UNE loops product group; combos-loop+port-design and combos-loop+port-non-design in the UNE loops and combos product group; and local IC trunks in the IC trunks product group.

Factors other than product groups and products also can be used to make a like-to-like comparison. In the exemplary embodiment, dispatched transactions are compared to other dispatched transactions and non-dispatched transactions are compared to other non-dispatched transactions. In addition, a comparison is made between transactions that involve a similar number of circuits, for example, less than ten circuits or greater than or equal to ten circuits. Moreover, a comparison is made for similar types of orders, such as new orders, transfer orders, change orders or pre-wire orders.

Exemplary Method for Analyzing Parity and Calculating a Remedy

Figure 2A:
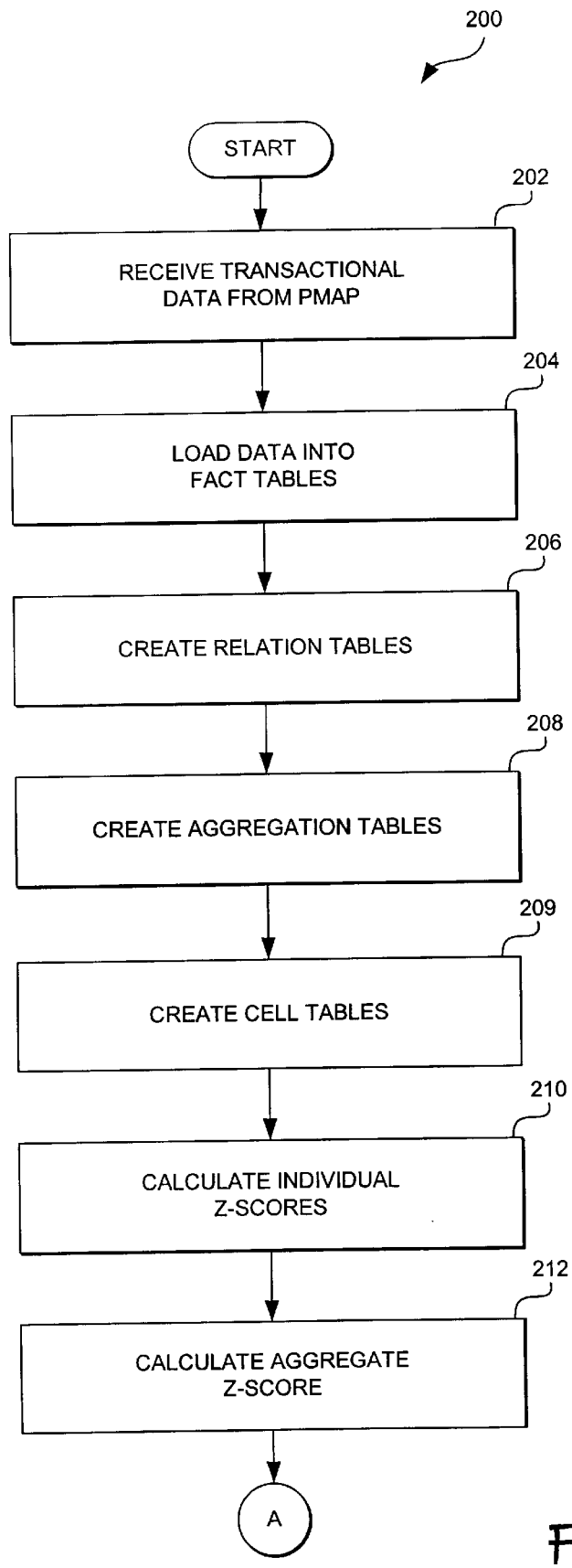
FIGS. 2A and 2B are flow diagrams illustrating an exemplary method for analyzing parity and calculating a remedy, in accordance with an embodiment of the invention.
Figure 2B:
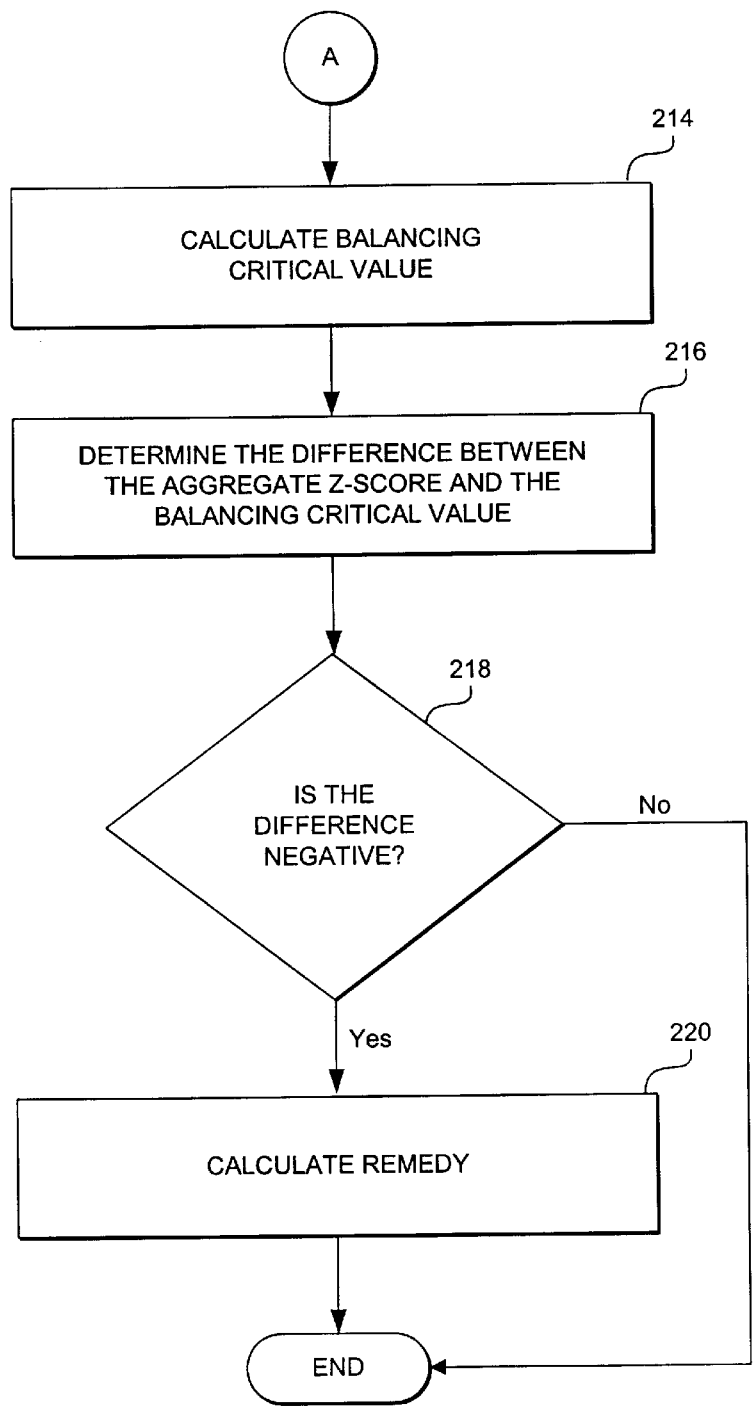

FIGS. 2A and 2B illustrate an exemplary method for analyzing performance measurements to determine whether parity exists and if parity does not exist, calculating a remedy. The method 200 begins at the START step in FIG. 2A and proceeds to step 202. In step 202 transactional data is received from the PMAP system. The transactional data is loaded into a number of fact tables in step 204. In the exemplary embodiment discussed herein, there are two types of fact tables, transaction based fact tables and subject area fact tables.

The transaction based fact tables include a service order fact table, a service line fact table, a service request fact table and a ticket fact table. The service order fact table contains service order transactions. The service line fact table contains service line information. The service request fact table contains performance measurements for services associated with a closed order. The ticket fact table contains trouble ticket transactions. Typically, multiple performance measurements are associated with a single transaction. As an example, the generation of a trouble ticket is a single transaction that is associated with a number of performance measurements, including measurements for customer trouble report rate, percent repeat troubles within 'x' days, and maintenance average duration.

The subject area fact tables include billing fact tables, a coordinated customer conversion fact table, an LNP (local number portability) disconnect fact table, an OSS (operational support systems) interface fact table and navigator contract fact tables. The billing fact tables include a billing invoice accuracy fact table, a billing invoice timeliness fact table, a usage data delivery accuracy fact table and a usage data deliver timeliness fact table. The subject area fact tables contain data associated with the subject areas.

Once the fact tables are loaded, the relation tables are created in step 206. In the exemplary embodiment, a relation table is created so that each row corresponds to a performance measurement for a particular transaction. The relation tables include a service order relation table, a service line relation table, a service request relation table and a ticket relation table. The performance measurement data for a relation table is obtained from the corresponding fact table. For example, the performance measurement data for the service order relation table is obtained from the service order fact table.

From step 206, the method proceeds to step 208 and the aggregation tables are created. The aggregation tables contain summarized data that is used in determining whether parity exists. The aggregation tables aggregate performance measurements at an appropriate level so that a like-to-like comparison is made. In the exemplary embodiment, the performance measurements are aggregated based on product group, product, entity, geography and time. The product groups and products used in the exemplary embodiment are summarized in Table 4 above. Entity refers to the ILEC, a particular CLEC or all of the CLECs within a state. Geography refers to location, such as a wire center, and state information. Time refers to a time period, usually the first half of the month or the second half of the month. Each row in an aggregation. table is related to a measurement and contains summarized information. For example, a row can contain summarized information for all of the transactions for a particular CLEC at a particular wire center for the first half of the month for a particular product.

In the exemplary embodiment, a mean aggregation table and a proportion rate aggregation table are created. The mean aggregation table is created using data from the service order fact table, the service order relation table, the ticket fact table and the ticket relation table. The proportion rate aggregation table is created using data from the service order relation table, the service line relation table and the ticket relation table.

Once the aggregation tables are created, the cell tables are created in step 209. Each cell in the cell table corresponds to a performance measurement and contains data for a service provided by the ILEC to its customers and data for an analogous service provided by the ILEC to the customers of a CLEC. The measurements within a cell are referred to herein as a related pair of performance measurements. Each cell contains two averages, an ILEC average and a CLEC average. In addition, each cell contains two counts, an ILEC count and a CLEC count. The counts correspond to the number of transactions used to compute the average.

For most performance measurements, if data does not exist for both the ILEC and the CLEC, then a cell is not created. However, if the performance measurement is a benchmark type of measurement, then a pair of performance measurements is not needed. The benchmark measurement is compared to a predetermined benchmark to determine whether the ILEC is providing an acceptable level of service to the CLEC.

Once the cell tables are created in step 209, the method proceeds to step 210. In step 210 an individual Z-score is calculated for each row in the cell table. The individual Z-score reflects the difference between the average of the ILEC performance measurements and the average of the CLEC performance measurements in the cell and is also referred to herein as a difference measurement. Additional details on the calculation of the individual Z-scores are provided in the section entitled "Calculating the Z-scores."

Once the individual Z-scores are calculated, the method proceeds to step 212. In step 212, an aggregate Z-score is calculated. The aggregate Z-score aggregates the individual Z-scores that are related to a particular CLEC. The aggregate Z-score is also referred to herein as an aggregate difference measurement. Additional details on the calculation of the aggregate Z-score are provided in the section entitled "Calculating the Z-scores."

Once the aggregate Z-score is calculated, the method proceeds to step 214 in FIG. 2B and a balancing critical value ("BCV") is calculated. The BCV balances the probability of a type I error and a type II error. A type I error results if the calculation of the aggregate Z-score indicates that favoritism exists, when no favoritism exists and a type II error results if the calculation indicates that parity exists, when favoritism exists. The BCV is calculated so that the probability of a type I error is equal to the probability of a type II error. Additional details on the calculation of the BCV are provided in the section entitled "Calculating the Balancing Critical Value."

From step 214 the method proceeds to step 216. In step 216, the difference between the aggregate Z-score and the BCV is calculated. In step 218 a determination is made as to whether the difference calculated in step 216 is negative. If the difference is negative, then it is determined that favoritism exists and the method proceeds along the YES branch to step 220.

In step 220 a remedy is calculated. Two types of remedies are computed, a tier 1 remedy and a tier 2 remedy. A tier 1 remedy is a remedy paid to an individual CLEC and is typically computed on a monthly basis. A tier 2 remedy is a remedy paid to a public service commission ("PSC") and is typically computed on a three-month rolling basis. The tier 2 remedy considers measurements for all CLECs within a state.

In the exemplary embodiment, a fee schedule is used to calculate the remedy. The fee schedule can be set by a PSC or by the ILEC, if the ILEC is making voluntary remedy payments. The number of failing CLEC transactions, i.e. transactions where parity did not exist, is multiplied by the amount shown on the fee schedule to determine the amount of the remedy. In some instances the fee schedule also provides for an increased remedy payment if there have been consecutive months of favoritism. If so, then the remedy is adjusted if parity did not exist in a previous month. Once the remedy is calculated, the method ends at the END step.

If the determination in step 218 is that the difference calculated in step 216 is not negative, then the determination is that parity exists. The method proceeds along the NO branch and the method ends at the END step.

Calculating the Z-scores

The individual Z-scores and the aggregate Z-score are statistical distributions. An individual Z-score is a distribution that approximates a standard normal with a mean of zero and a variance of one. An individual Z-score is negative if the CLEC performance measurements are worse than the ILEC performance measurements. The calculation of an individual Z-score varies based on the type of performance measurement, i.e. different calculations are used for mean measurements, proportion measurements, rate measurements and ratio measurements. In addition, the calculation of an individual Z-score for a mean measurement varies based on the counts associated with the cell.

The individual Z-scores are truncated by setting an individual Z-score to zero if it is positive. However, to limit the amount of cancellation that occurs in calculating the aggregate Z-score, an individual Z-score is left alone if it is negative. The theoretical mean and variance of each truncated Z-score is calculated under a null hypothesis that parity exists. The calculation of the theoretical mean and variance varies based on the type of measurement. The theoretical mean and variance are used to re-center and scale an aggregated weighted sum of the truncated Z-scores so that the aggregate Z-score ($Z^T$) follows a standard normal distribution. In the exemplary embodiment, the aggregate Z-score is calculated as shown below.

$$Z^T = \frac{\sum_j W_j Z_j^* - \sum_j W_j E(Z_j^* | H_0)}{\sqrt{\sum_j W_j^2 \mathrm{Var}(Z_j^* | H_0)}}$$

where

L=total number of occupied cells j=1, 2, 3 . . . L; index for the cells $W_j$=cell weight for cell j $Z^*_j$=truncated Z-score for cell j $E(Z^*_j|H_0)$=theoretical mean under null hypothesis of parity $\mathrm{Var}(Z^*_j|H_0)$=theoretical vmance under null hypothesis of parity The aggregate Z-score is calculated for a particular CLEC (or for all CLECs), for a particular state and for a particular product.

Calculating the Balancing Critical Value

The BCV is calculated so that the probability of a type I error is equal to the probability of a type II error. A type I error results if the calculation indicates that favoritism exists, when no favoritism exists and a type II error results if the calculation indicates that parity exists, when there is favoritism. In the exemplary embodiment, the BCV ($C_B$) is calculated as shown below.

$$c_B = \frac{\sum_j W_j M(m_j, se_j) - \sum_j W_j \frac{-1}{\sqrt{2\pi}}}{\sqrt{\sum_j W_j^2 V(m_j, se_j)} + \sqrt{\sum_j W_j^2 \left(\frac{1}{2} - \frac{1}{2\pi}\right)}}.$$

$$M(\mu,\sigma) = \mu\Phi(-\mu/\sigma) - \sigma\phi(-\mu/\sigma)$$

$$V(\mu,\sigma) = (\mu^2+\sigma^2)\Phi(-\mu/\sigma) - \mu\sigma\phi(-\mu/\sigma) - M(\mu,\sigma)^2$$

where

L=total number of occupied cells j=1, 2, 3 ... L; index for the cells $W_j$=cell weight for cell j $m_j$=mean $se_j$=standard error $\Phi(\ )$=cumulative standard normal distribution function $\phi(\ )$=standard normal density function The calculation of the mean and standard error differs based on the type of performance measurement.

Additional alternative embodiments will be apparent to those skilled in the art to which the present invention pertains without departing from its spirit and scope. For example, additional or alternative performance measurements can be used and the calculation of the individual Z-scores or the aggregate Z-score can be modified. Moreover, the use and organization of the fact tables, relation tables and aggregation tables can differ from that described herein. Accordingly, the scope of the present invention is described by the appended claims and is supported by the foregoing description.

What is claimed is:

1. A method for comparing services provided by an incumbent local exchange carrier ("ILEC") to its customer and services provided by the ILEC to a customer of a competitive local exchange carrier ("CLEC"), comprising:

receiving ILEC data for a first transaction where the ILEC provided a first service to its customer;

receiving CLEC data for a second transaction where the ILEC provided a second service to the customer of the CLEC;

identifying a plurality of ILEC performance measurements for the first transaction;

identifying a plurality of CLEC performance measurements for the second transaction;

identifying a plurality of related pairs of performance measurements from the ILEC performance measurements and the CLEC performance measurements, each related pair including related ILEC performance measurements and related CLEC performance measurements;

for each related pair, comparing the related ILEC performance measurements and the related CLEC performance measurements to determine a difference measurement;

determining an aggregate difference measurement;

determining a balancing critical value;

comparing the aggregate difference measurement to the balancing critical value to compare the services provided by the ILEC to its customer to the services provided by the ILEC to the customer of the CLEC.

2. The method of claim 1, wherein the related ILEC performance measurements and the related CLEC performance measurements are mean measurements.

3. The method of claim 1, wherein the related ILEC performance measurement and the related CLEC performance measurement correspond to a common time period.

4. The method of claim 1, wherein a parity probability represents a probability that parity is determined when favoritism actually exists and a favoritism probability is a probability that favoritism is determined when parity actually exists, and wherein the balancing critical value balances the parity probability and the favoritism probability.

5. The method of claim 1, wherein comparing the related ILEC performance measurements and the related CLEC performance measurements to determine a difference measurement, comprises:

determining an ILEC distribution for the related ILEC performance measurements;

determining a CLEC distribution for the related CLEC performance measurements; and comparing the ILEC distribution and the CLEC distribution to determine the difference measurement.

6. A method for comparing services provided by an incumbent local exchange carrier ("ILEC") to its customers to services provided by the ILEC to customers of a competitive local exchange carrier ("CLEC"), comprising:

receiving ILEC data that measures the services provided by the ILEC to its customers;

receiving CLEC data that measures the services provided by the ILEC to the customers of the CLEC;

identifying a plurality of related pairs of performance measurements, each related pair including a related ILEC performance measurement and a related CLEC performance measurement;

for each related pair, determining a difference measurement based on the related ILEC performance measurements and the related CLEC performance measurements;

determining an aggregate difference measurement based on the difference measurements for the related pairs; and using the aggregate difference measurement to compare the services provided by the ILEC to its customers to the services provided by the ILEC to the customers of the CLEC.

7. The method of claim 6, wherein a parity probability represents a probability that parity is determined when favoritism actually exists and a favoritism probability is a probability that favoritism is determined when parity actually exists, further comprising:

calculating a balancing critical value that balances the parity probability and the favoritism probability; and comparing the aggregate difference measurement to the balancing critical value.

8. The method of claim 6, wherein the related ILEC performance measurement and the related CLEC performance measurement measure timeliness of service.

9. The method of claim 6, wherein the related ILEC performance measurements and the related CLEC performance measurements measure accuracy of service.

10. The method of claim 6, wherein the related ILEC performance measurements and the related CLEC performance measurements measure availability of service.

11. The method of claim 6, wherein the related ILEC performance measurements corresponds to a product group and the related CLEC performance measurements corresponds to an analogous product group.

12. A method for calculating a remedy if parity does not exist between services provided by an incumbent local exchange carrier ("ILEC") to its customers and services provided by the ILEC to customers of a competitive local exchange carrier ("CLEC"), comprising:

receiving ILEC data that measures the services provided by the ILEC to its customers;

receiving CLEC data that measures the services provided by the ILEC to the customers of the CLEC;

identifying a plurality of related pairs of performance measurements, each related pair including a related ILEC performance measurement and a related CLEC performance measurement;

for each related pair, determining a difference measurement based on the related ILEC performance measurements and the related CLEC performance measurements;

determining an aggregate difference measurement based on the difference measurements for the related pairs;

determining a balancing critical value;

comparing the aggregate difference measurement to the balancing critical value to compare the services provided by the ILEC to its customers to the services provided by the ILEC to the customers of the CLEC; and if the comparison indicates that parity does not exist, then calculating a remedy.

13. The method of claim 12, wherein calculating a remedy comprises:

calculating a remedy for a selected CLEC.

14. The method of claim 12, wherein calculating a remedy comprises:

calculating a remedy for all CLECs within a state.

15. The method of claim 12, wherein calculating a remedy comprises:

using a fee schedule to calculate the remedy.

16. The method of claim 12, wherein calculating a remedy comprises:

determining whether a previous remedy was calculated for a previous month; and if a previous remedy was calculated for a previous month, then adjusting the remedy.

* * * * *